United States Patent Office 3,841,966
Patented Oct. 15, 1974

3,841,966
METHOD OF PREPARING AN OPTICALLY ACTIVE AMINO ACID FROM A SALT OF AN ACYL DERIVATIVE THEREOF IN THE RACEMIC FORM
Soichiro Asai, Shoichi Ishii, and Tsutomu Tabira, Kawasaki, and Eigo Tsuchiya and Hideo Tazuke, Tokyo, Japan, assignors to Ajinomoto Co., Inc., Tokyo, Japan
Filed Mar. 6, 1973, Ser. No. 338,430
Claims priority, application Japan, Aug. 31, 1972, 47/87,419
Int. Cl. C12b 1/00
U.S. Cl. 195—2
8 Claims

ABSTRACT OF THE DISCLOSURE

Acylase selectively hydrolyzes a salt of an acyl derivative of a racemic amino acid to one enantiomorph of the nonacylated amino acid, and the mother liquor then is capable of selectively dissolving the acyl derivative salt of the one enantiomorph from crystals of the racemic salt, leaving residual crystals enriched with the salt of the acyl derivative of the other enantiomorph of the amino acid. The one enantiomorph and the enriched crystals may be separated from the mother liquor at different stages of the process, and the mother liquor then returned to the cycle for producing more optically active material by means of the same amount of acylase. The method is generally applicable to acyl derivative salts of racemic amino acids capable of being hydrolyzed by acylase which are more soluble in water than the corresponding salts of the acylated optically active forms of the amino acid.

---

Figure 1:
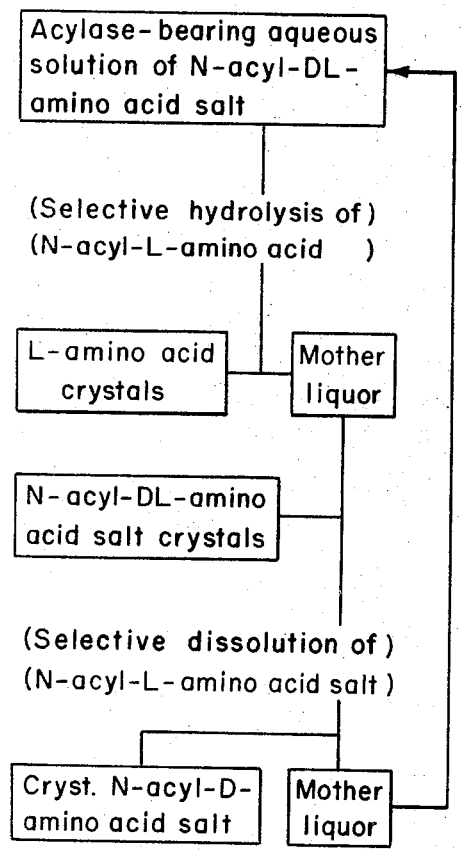

This invention relates to a method of optically resolving amino acids and derivatives thereof, and particularly to a method of preparing an optically active enantiomorph of an amino acid from a salt of an N-acyl derivative of the amino acid in the racemic form.

Acylase is known selectively to hydrolyze N-acyl derivatives of one enantiomorph of an amino acid in the N-acyl derivative of the racemic acid, thereby converting the N-acyl-DL-amino acid into a mixture of the acid furnishing the initial acyl moiety, one enantiomorph of the amino acid, and the N-acyl derivative of the other enantiomorph. The three reaction products are readily separated on the basis of different solubilities and other physical properties.

Acylase has been used for preparing one optically active enantiomorph of an amino acid by a batch process based on the selective hydrolyzing effect of the enzyme, but the method, as practiced heretofore, is uneconomical. It is necessary during work-up of the conventional deacylation mixture to coagulate or otherwise inactivate the acylase prior to recovery of the desired product, and much acylase goes to waste. When only a small portion of the N-acyl-DL-amino acid is converted to the desired enantiomorph in the batch process, the residual material could be used again, but the recovery of the product and the preparation of the residual material for repeated use are difficult. The recovered N-acyl derivative of the other enantiomorph is normally of low optical purity and can usually only be used as raw material for racemization.

It has now been found that the by-products of the method, that is, the carboxylic acid of the original acyl moiety and the N-acyl derivative of the undesired amino acid enantiomorph, repress acylase activity, and that this fact accounts for many of the difficulties encountered heretofore in preparing an optically active amino acid from an acyl derivative of its recemic form. A high resolution ratio, that is, a high mole ratio of formed desired amino acid enantiomorph to initially employed acyl derivative of the racemic amino acid, can be obtained only by either using a very large amount of costly acylase or by operating in a very dilute aqueous medium which requires the handling and ultimate removal of a large amount of water.

In view of these problems, it has been proposed to convert the acylase to an insoluble material, and to pass the N-acyl derivative of the racemic amino acid through a filter packed with the insolubilized enzyme. The method has not been successful on an industrial scale because of difficulties in maintaining the activity of the enzyme and in maintaining the permeability of the filter.

It has now been found that acylase can be used practically to exhaustion of its enzyme activity for preparing an enantiomorph of an amino acid from an N-acyl derivative of the racemic form of the acid, more specifically a salt of the derivative, by contacting the salt in an aqueous medium containing an effective amount of acylase until the desired enantiomorph is formed by the acylase simultaneously with the forming of a corresponding amount of the acyl derivative of the other enantiomorph of the amino acid salt. The aqueous medium thereeafter is contacted with crystals of the acyl derivatives of the racemic amino acid salt, while it contains the afore-mentioned acyl derivative of the other enantiomorph. If the solubility of the acyl-racemate is greater than that of the corresponding derivatives of the enantiomorphs, the medium preferentially dissolves from the crystals the acyl derivative salt of the one enantiomorph so that the residual crystals are enriched with the acyl salt of the other enantiomorph. It is relatively simple to recover the one enantiomorph of the amino acid separately in high optical purity from the medium, and the acyl derivative of the other amino acid enantiomorph salt is separated from the medium without difficulty and is not severely contaminated with the salt of the one enantiomorph. After removal of the two products, the mother liquor is again ready for further selective deacylation by the acylase still present.

The attached drawing diagrammatically illustrates preferred embodiments of the invention.

Figure 2:
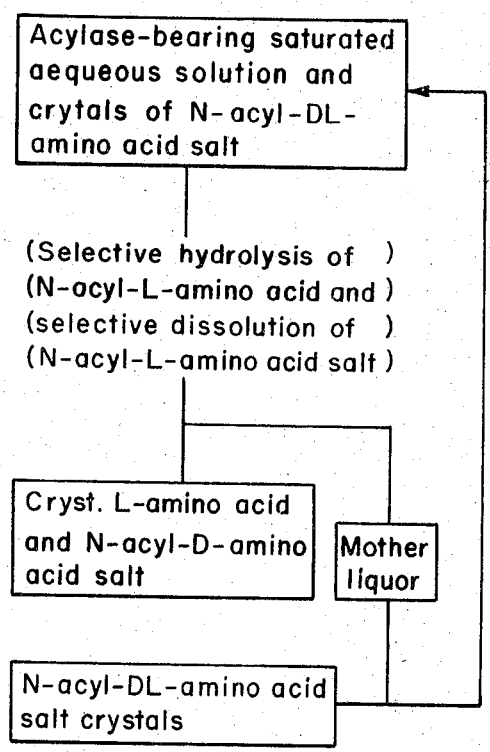

FIG. 1 shows an embodiment of the invention in which the desired optically active amino acid is recovered at an early stage of the process; and FIG. 2 shows another embodiment in which the amino acid enantiomorph is removed from the mother liquor in a mixture with the salt of the N-acyl derivative of the other enantiomorph for later separation.

For the sake of simplicity, "acyl" in this specification is used for "N-acyl," and the L-enantiomorph is considered to be desired, as is often the case, though not necessarily.

Referring initially to FIG. 1, the starting material is an aqueous solution of an N-acyl-DL-amino acid salt containing acylase. During the subsequent selective hydrolysis of the L-form of the salt, L-amino acid is formed and crystallizes under suitably chosen operating conditions while the mother liquor, readily separated from the crystals, is enriched with the salt of the N-acyl-D-amino acid. The enriched mother liquor is then contacted with crystals of additional N-acyl-DL-amino acid salt from which the L-form is selectively dissolved, while the residual crystals consist of, or are at least enriched with, the N-acyl-D-amino acid salt which may thus be recovered separately. The composition of the mother liquor at this stage is the same or is readily adjusted to be the same as that of the starting material except for the carboxylic acid from the acyl moieties, and is subjected to the same cycle of steps which may be repeated as long as the acylase remains adequately active.

The success of this method depends on few critical conditions. The acylase must be capable of deacylating the specific salt of the acyl-L-amino acid; the salt of the N-acyl-DL- amino acid must be a racemate more soluble than the corresponding derivatives of the optically active forms of the amino acid; and the base moiety of the salt must be free of deleterious influence on the acylase effect. All other process variables are of relatively minor importance and will readily suggest themselves to those skilled in the art.

Thus, the starting solution may have, and actually should have, as high a concentration of the acyl-DL-amino acid salt as possible. The pH of the starting solution is chosen for good acylase activity and low solubility of the L-amino acid. If the pH ranges of optimum acylase activity and low amino acid solubility do not overlap, the amino acid may be precipitated by removing some of the solvent water or cooling the reaction mixture. The optical purity of the recovered amino acid is 100% if elementary precautions are taken to avoid contamination.

The amount of acyl-DL-amino acid salt crystals contacted with the mother liquor after removal of the L-amino acid should be chosen to provide an amount of acyl-D-amino acid salt equivalent to the removed L-amino acid so that the optical purity of the residual crystals is high. A purity of 90% or better is achieved without difficulty. The recovered acyl-D-amino acid salt may then be racemized prior to return to the process if there is no use for the D-form, and very little of the L-form will be lost therewith.

The mother liquor remaining after removal of the acyl-D-amino acid salt still contains a small amount of dissolved L-amino acid, which is recovered in subsequent cycles, and the carboxylic acid derived from the hydrolyzed acyl moieties. The amount of the carboxylic acid, which supresses acylase activity, is increased gradually. However, the concentration of the other by-product, acyl-D-amino acid, is almost constant so that the mother liquor can be recycled several times before there is a sufficient decline in acylase activity to require partial or total replacement of the liquid medium or replenishment with fresh acylase.

If the amino acid processed is very soluble in water, recovery of the acid may be postponed so that none is recovered in the first cycle, the first recovery taking place in the second or subsequent cycles. The same effect may be achieved by adding a sufficient amount of the L-amino acid to the starting solution, and thereby permitting partial recovery of the amino acid in the first cycle. The purity of the products remains constant through a long sequence of cycles regardless of declining acylase activity.

The number of cycles possible without replenishing the acylase or otherwise rejuvenating the liquid medium depends largely on the nature and amount of the acylase initially added to the hydrolysis mixture, on the composition of the acylamino acid salt, and the like. Generally, at least 3 and often as many as 10 cycles can be performed with a single charge of acylase.

Because the liquid medium is recycled, it is not necessary that the resolution ratio in each cycle be very high, and the amount of acylase originally supplied may be quite small, further contributing to the high yields of L-amino acid per weight unit of acylase which is achieved by the method of this invention.

The sequence of the individual steps illustrated in FIG. 1 may be changed without losing the basic advantages of this invention.

Thus, the L-amino acid need not be recovered prior to contacting the mother liquor with crystals of acyl-DL-amino acid salt, and a solid mixture of L-amino acid and acyl-D-amino acid salt may be permitted to form. The mixture is separated from the liquid medium, and its constituents are separated from each other on the basis of different solubilities or otherwise, as will be obvious and is not relevant to this invention. One known separation procedure, particularly suitable for the modified method of the invention, relies on the use of very coarse acyl-DL- amino acid crystals which may be separated mechanically from the usually much smaller crystals of the L-amino acid even after dissolution of the acyl-L-amino acid salt.

Yet another modification is diagrammatically illustrated in FIG. 2. The starting solution containing acylase is saturated at the chosen temperature with the acyl-DL-amino acid salt and is in contact with additional acyl-DL-amino acid salt in the solid, crystalline state while undergoing selective hydrolysis by the acylase. A solid mixture of L-amino acid and N-acyl-D-amino acid salt is thus formed in the first process step, separated from the liquid medium, and separated into its components as described above. The mother liquor may be returned to the process as starting material and is preferably replenished by contact with crystals of acyl-DL-amino acid salt before undergoing the first step of the cycle in which the amount of crystals in contact with the liquid medium is preferably chosen to provide only as much acyl-L-amino acid salt as L-amino acid is expected to be precipitated, the respective amounts being expressed in moles.

The role of specific process variables in the method of FIG. 2 will be evident from the more detailed preceding discussion of FIG. 1. The fact that the acylase attacks the acyl-DL-amino acid salt in a saturated solution, that is, a solution of constant and highest possible concentration, has a beneficial effect on the enzyme efficiency.

The method of the invention has been found to operate with all N-acyl-DL-amino acid salts capable of being selectively hydrolyzed by an available acylase, and having a racemic form more soluble in water than the forms derived from the optically active amino acids. No N-acyl-DL-amino acid salts meeting this requirement and not capable of being converted to a desired enantiomorph of the deacylated amino acid have been found, and the following N-acyl-DL-amino acid salts have been processed successfully by the method of the invention on a significant scale:

N-acetyl-phenylalanine ammonium salt
N-acetyl-tryptophan ammonium salt
N-acetyl-methionine ammonium salt
N-acetyl-valine ammonium salt
N-acetylphenylglycine ammonium salt
N-acetyl-3,4-methylenedioxyphenylalanine ammonium salt
N-acetyl-phenylalanine cyclohexylamine salt
N-acetyl-phenylalanine monoethylamine salt
N-acetyl-phenylglycine monoethylamine salt
N-acetyl-tryptophan monoethylamine salt
N-acetyl-valine monoethylamine salt.

The above salts were chosen mainly because of the low solubility of the amino acids in water which makes recovery particularly simple. Best in this respect are phenylalanine, 3,4-methylenedioxyphenylalanine, phenylglycine, and tryptophan.

The nature and origin of the acylase employed is of minor relevance, if any, as long as the acylase is capable of causing the desired selective deacylation. Acylase derived from molds (Aspergillus, Penicillium), bacteria (Achromobacter, Pseudomonas, Micrococcus, Alkaligenes) and actinomycetes (Streptomyces) have been used successfully. The acylase concentration in the starting material is initially between 0.5% and 1% by weight, although as little as 0.1% is effective, and as much as 3% may be resorted to under suitable circumstances, the amounts being based on the weight of the N-acyl-DL-amino acid in the hydrolysis mixture, and acylase of good activity. Acylase of lower than best activity may have to be used in amounts much greater than those indicated as being preferred.

Many acylases are known to be activated and/or stabilized by cobalt ions, and such ions may be supplied, as is conventional in itself. The hydrolysis temperature is not critical, but must be chosen to suit the enzyme employed.

Many acylases work best at 35° to 40° C., and most have their optimum activity between 20° and 60° C.

The following examples are further illustrative of this invention.

EXAMPLE 1

Concentrated ammonium hydroxide solution was added to a slurry of 650 ml. water and 140 g. N-acetyl-DL-phenylalanine until a solution of pH 6.5 was formed. 2.8 g. acylase (15,000 units/g.) was added to the solution which was stirred at 37° C. for 30 hours. It was then cooled to 15° C. with continued stirring, and a crystalline precipitate of L-phenylalanine was filtered off.

The recovered L-phenylalanine weighed 27 g. and had an optical purity of 100%.

The mother liquor was mixed with 145 g. N-acetyl-DL-phenylalanine ammonium salt. The mixture was heated briefly to 40° C., then cooled to 15° C. with stirring, and undissolved crystals were filtered off. They consisted of N-acetyl-D-phenylalanine ammonium salt having an optical purity of 96.3% and weighed 68 g.

The filtrate was again stirred at 37° C. for 30 hours to start a new cycle. The procedure outlined above was repeated through nine cycles and yielded 324 g. L-phenylalanine of 100% optical purity, or 115 g. L-phenylalanine per gram of the acylase initially introduced into the reaction system.

EXAMPLE 2

An aqueous solution of the ammonium salt of N-acetyl DL-phenylalanine was prepared as in Example 1 from 140 g. of the free acid, 650 ml. water, and concentrated ammonium hydroxide solution. 2.0 g. acylase was added, and the solution was stirred at 37° C. for 24 hours and then cooled to 15° C. with continued stirring. 28 g. L-phenylalanine were recovered and had an optical purity of 100%.

The mother liquor was contacted with additional N-acetyl-DL-phenylalanine ammonium salt to produce a crop of N-acetyl-D-phenylalanine ammonium salt crystals and a liquid fraction which was returned to the process. Seven cycles were performed, but the deacylation period was gradually increased in each cycle to an ultimate value of 90 hours in the last cycle.

The total amount of recovered L-phenylalanine of 100% optical purity was 266 g. or 133 g. per gram of acylase.

EXAMPLE 3

A solution of the ammonium salt of N-acetyl-DL-phenyl-alanine having a pH of 6.5 was prepared from 210 g. N-acetyl-DL-phenylalanine, 650 water, and concentrated ammonium hydroxide solution as in the preceding examples. It was mixed with 1 g. acylase and enough cobalt acetate to make the cobalt ion concentration $10^{-4}$ mole per liter. After being stirred at 37° C. for 60 hours, the mixture was cooled to 30° C., and the precipitated L-phenylalanine of 100% optical purity was filtered off. It weighed 45 g.

The mother liquor was briefly heated to 45° C. with 200 g. N-acetyl-DL-phenylalanine ammonium salt and cooled to 30° C. The undissolved crystals of N-acetyl-D-phenylalanine ammonium salt were filtered off, weighed 118 g. and had an optical purity of 90.8%. The filtrate was stirred at 37° C. for 60 hours in the starting phase of a new cycle.

The procedure was repeated four times, and the total recovered L-phenylalanine of 100% optical purity weighed 161 g., that is, 161 g., L-phenylalanine per gram acylase of 15,000 units/g.

EXAMPLE 4

A solution of N-acetyl-DL-tryptophan ammonium salt was prepared as above from 91 g. of N-acetyl-DL-tryptophan, 670 ml. water, and sufficient concentrated ammonium hydroxide solution to pH 7.0. 1.8 g. acylase and cobalt acetate were added to the solution as in Example 3, and the mixture was stirred at 40° C. for 30 hours.

The precipitated and filtered crystals of L-tryptophan weighed 16.5 g. and had an optical purity of 100%.

The mother liquor was stirred briefly at 45° C. with 75 g. N-acetyl-DL-tryptophan ammonium salt, and then cooled to 40° C. The residual crystals of N-acetyl-D-tryptophan ammonium salt were covered by filtering and had an optical purity of 93.8% and a weight of 35 g.

The filtrate was stirred at 40° C. for 48 hours to produce another crop of L-tryptophan crystals. After six repetitions of the cycle, 145 g. optically pure L-tryptophan was obtained.

EXAMPLE 5

A solution of 300 g. N-acetyl-DL-methionine ammonium salt in 900 g. water having a pH of about 7.0 mixed with 10 ml. 0.01-molar cobalt acetate solution and 3 g. acylase, and the mixture was stirred for 48 hours at 37° C. It was then heated in a vacuum to 30° C. to 45° C. until one liter of water was evaporated. Optically pure L-methionine crystallized from the concentrate and was filtered off. It weighed 72 g.

The mother liquor was mixed with one liter water and 260 g. N-acetyl-DL-methionine ammonium salt, and the mixture was heated to 44° C. and thereafter cooled to 37° C. The residual crystals were recovered by filtering and consisted of 135 g. N-acetyl-D-methionine ammonium salt having an optical purity of 94%.

The filtrate was again stirred 48 hours at 37° C. in the first stage of a new cycle. The procedure outlined above was repeated five times for a total yield of 310 g. L-methionine having an optical purity of 100%.

EXAMPLE 6

300 g. N-acetyl-DL-phenylglycine ammonium salt was dissolved in 1000 ml. of water, and the solution was stirred 72 hours at 37° C. with 10 ml. 0.01-molar cobalt acetate solution and 3 g. acylase. It was partly evaporated in a vacuum at 30° to 40° C. until 670 ml. water was removed. The precipitated crystals of optically pure L-phenylglycine were recovered by filtering and weighed 93 g.

The mother liquor was diluted with 670 ml. water and mixed with 270 g. N-acetyl-DL-phenylglycine ammonium salt, and the mixture was briefly heated to 45° C. and then cooled to 30° C. while being stirred. The residual crystals of N-acetyl-D-phenylglycine ammonium salt having an optical purity of 96% were filtered off and weighed 137 g. The filtrate was again subjected to the hydrolysis stage of a next cycle. After four repetitions of the cycle using the initially added acylase, 325 g. L-phenylglycine of 100% optical purity and 472 g. N-acetyl-D-phenylglycine ammonium salt of 96% optical purity were obtained in solid crystalline form.

EXAMPLE 7

A solution of N-acetyl-DL-phenylalanine ammonium salt of pH 6.5 was prepared as in Example 1 from 370 g. of the free acid, 1000 ml. water and ammonium hydroxide solution. It was mixed at once with 10 ml. 0.01-molar cobalt acetate solution, 2 g. acylase, and 320 g. crystalline N-acetyl-DL-phenylalanine ammonium salt. The slurry so prepared was stirred 48 hours at 37° C. It was then filtered. The recovered solids weighed 348 g. and contained 124 g. L-phenylalanine.

260 g. N-acetyl-DL-phenylalanine ammonium salt was added to the mother liquor, and the mixture was stirred 72 hours at 37° C. It was then filtered to recover 265 g. solids containing 87 g. L-phenylalanine.

The two crystal crops were combined and slurried in 1.5 liter water. The slurry was stirred one hour at 40° C. and then filtered. The recovered solids consisted of 152 g. L-phenylalanine of 100% optical purity.

EXAMPLE 8

A hydrolysis mixture was prepared as in Example 7 from 105 g. N-acetyl-DL-tryptophan ammonium salt, 750 ml. water, 3 ml. 0.01-molar cobalt acetate solution, 1.8 g. acylase, and 210 g. crystalline N-acetyl-DL-tryptophan ammonium salt in the order listed. The resulting slurry was stirred 120 hours at 37° C. and filtered thereafter. The recovered solids weighed 205 g. and contained 92 g. L-tryptophan. They were stirred with 1500 ml. water at 40° C. for one hour, and the suspension was then filtered. The solids recovered consisted of 79 g. L-tryptophan of 100% optical purity.

In the preceding examples, the D- and L-forms may be interchanged without affecting the results achieved, but the L-form of the amino acid has been chosen throughout for illustration as the desired product, as will most often be the case in actual performance of the method of the invention.

While acetylamino acids were mentioned in all examples, the N-formyl, N-chloroacetyl, N-propionyl, N-benzoyl and numerous other N-acyl-DL-amino acids are known to be capable of being selectively hydrolyzed by acylases. Salts of these N-acyl-DL-amino acids may be employed instead of the illustrative N-acetyl-DL-amino acid salts in the method of the invention, if their solubilities are greater than those of the corresponding optically active N-acylamino acid salts.

What is claimed is:

1. A method of preparing one optically active enantiomorph of an amino acid from a salt of an N-acyl derivative of the racemic form of said acid which comprises:
   (a) contacting said salt in an aqueous medium with an effective amount of acylase until said one enantiomorph is formed by said acylase simultaneously with the forming of a corresponding amount of the salt of said acyl derivative of the other enantiomorph of said amino acid;
   (b) contacting said aqueous medium containing said acylase and the salt of said acyl derivative of the other enantiomorph with crystals of the salt of said acyl derivative of said racemic form until an amount of salt of said acyl derivative of said one enantiomorph is dissolved from said crystals into said medium, and the residual crystals are enriched with the salt of said acyl derivative of said other enantiomorph; and
   (c) recovering said one enantiomorph from said medium in substantially pure form,
   (1) the solubility in water of said salt of said acyl derivative of the racemic form of said amino acid being greater than the solubilities of said salts of the acyl derivatives of the optically active enantiomorphs of said amino acid,
   (2) said acylase being capable of selectively deacylating said salt of said acyl derivative of said other enantiomorph,
   (3) the base moiety of said salt being free of deleterious influence on the deacylating effect of said acylase.

2. A method as set forth in claim 1, wherein, after said recovering, said medium having said amount dissolved therein is held until an additional amount of said one enantiomorph is formed by said acylase.

3. A method as set forth in claim 2, wherein said one enantiomorph is recovered from said aqueous medium prior to said contacting of said medium with said crystals.

4. A method as set forth in claim 3, wherein said enriched residual crystals are recovered from said medium prior to said holding.

5. A method as set forth in claim 2, wherein said one enantiomorph and said residual crystals are jointly removed from said medium as a mixture, and the removed enantiomorph thereafter is separated from the remainder of said mixture.

6. A method as set forth in claim 1, wherein said dissolved salt of said acyl derivative of said racemic form is contacted with said acylase while said medium is in contact with said crystals and prior to said forming of said one enantiomorph.

7. A method as set forth in claim 6, wherein said residual crystals are recovered from said medium separately from said one enantiomorph.

8. A method as set forth in claim 1, wherein said amino acid is phenylalanine, tryptophan, methionine, valine, phenylglycine, or 3,4-methylenedioxyphenylalanine, and said acyl is acetyl.

References Cited

UNITED STATES PATENTS 3,290,225   12/1966   Rauenbusch et al. ____ 195—29
3,347,752   10/1967   Rauenbusch et al. ____ 195—29

LIONEL M. SHAPIRO, Primary Examiner

R. J. WARDEN, Assistant Examiner